Dec. 31, 1935. G. D. MATTIOLI 2,026,482
CONTROL FOR AEROFOILS, ETC
Filed Aug. 31, 1933
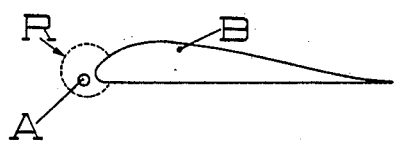
Fig. 1
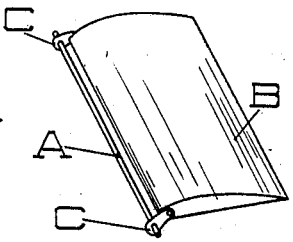
Fig. 2
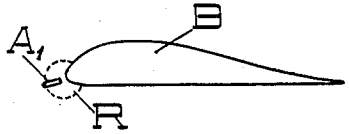
Fig. 3
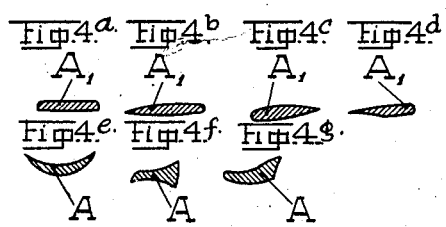
Fig. 4a. Fig. 4b. Fig. 4c. Fig. 4d.
Fig. 4e. Fig. 4f. Fig. 4g.
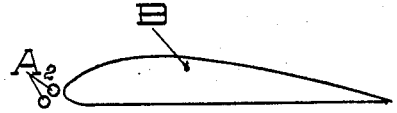
Fig. 5
Fig. 6
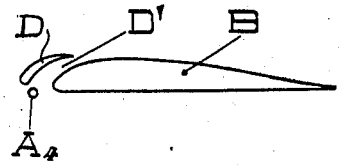
Fig. 7
Gian Domenico Mattioli
Inventor,
by Morrison, Kennedy + Campbell
Attorneys.

Patented Dec. 31, 1935

2,026,482

UNITED STATES PATENT OFFICE 2,026,482

CONTROL FOR AEROFOILS, ETC.

Gian Domenico Mattioli, Padoa, Italy

Application August 31, 1933, Serial No. 687,606
In Italy September 9, 1932

4 Claims. (Cl. 244—12)

The present invention relates to controls for aerofoils, etc., and involves a method of and means for increasing the ability to operate safely beyond the usual stalling angle of aerofoils or hydrofoils, such as the wings of aircraft, in order to render it controllable beyond the angle of stall. The term "aerofoil" is intended to cover the wing and control surfaces of aircraft and watercraft of all types and rotary propelling apparatus for aerial and marine craft and the like.

It has been proven that the carrying capacity of aircraft, such as an aeroplane, is a function of the wing incidence, and increases up to a certain critical value of the angle of incidence, that is, the angle of stall, approximately 14° to 16°. If the angle of incidence is increased beyond this value, the carrying power of the aeroplane rapidly decreases. Consequently if, by design or accident, a wing is set at an angle of incidenece greater than the critical angle, the aeroplane becomes uncontrollable, and, unless the pilot is very skilled, stalls and falls into a spinning dive. The lack of security in flying is, to a large extent, due to this tendency for aircraft to fall into a spin immediately the critical angle of incidence is exceeded, and it has been shown that 70% of the accidents to aircraft are due to this cause. The problem, therefore, consists in preventing a decrease in the carrying power of aircraft when the critical angle is exceeded: in other words, it consists in straightening the carrying power curve beyond the critical angle.

It has been found that the sudden decrease in carrying power which occurs when the critical angle of incidence is exceeded is due to the formation of eddy currents and an object of the invention is to influence favourably the flow that is established about an aerofoil or hydrofoil, such as the carrying wing of an aeroplane, so that the critical angle of incidence is raised in certain cases to approximately 32°–34°. When the aerofoils or hydrofoils in question are immersed in a fluid current, or when they travel in a fluid which is at rest, the surrounding fluid exerts thereon a force, the orthogonal component (representing the carrying power) of the force depending upon the circulation velocity of the fluid about the sections of the aerofoil or hydrofoil. In order to increase the carrying capacity, it is of advantage to cause the velocity of the fluid relatively to the aerofoil or hydrofoil to be as high as practicable. Now, experience has shown that the circulation decreases when the fluid surrounding the rear of the aerofoil or hydrofoil detaches itself from the surface of the aerofoils or hydrofoils prior its conjunction with the current that has followed the inferior path. This premature detachment of the currents occurs, for instance, in the case of aeroplane-wings, when the angle of incidence exceed the angle of stall. As has already been mentioned, it has been shown by experiment that, whilst the carrying power increases with increasing angle of incidence up to the critical angle, the carrying power continually decreases once this critical angle has been exceeded. The present invention is directed towards counteracting this decrease by influencing the fluid layer in contact with the upper or rear surface of the supporting body or other aerofoil or hydrofoil. This fluid layer will hereinafter be termed the "limiting layer", or boundary layer.

According to the invention a method of increasing the carrying or driving efficiency of an aerofoil or hydrofoil consists in reducing the adherence of the fluid to the aerofoil or hydrofoil beyond the stall by rendering the "limiting layer" of the fluid turbulent by means arranged in the zone of the leading edge of the aerofoil or hydrofoil.

The device of means for rendering the limiting-layer turbulent comprise one or more members termed bars, the width of which is substantially of the order of the thickness of the "limiting layer" to be rendered turbulent thereby. By bars is intended any elongated members, as wires or laths; and these are transversely arranged, suspended in adjacent and spaced relation to the leading edge, parallel and in front thereof. Such bars are relatively small, as stated, indeed only a minute fraction of the chord of the aerofoil, preferably under four or five per cent thereof, or even between one and two per cent.

With this arrangement, when the supporting body is inclined at an angle in excess of the critical angle, the premature detachment of the fluid currents from the rear surface of the wing or the like supporting body, due to the increase in the angle of incidence, is prevented or rendered more difficult. In this manner it is possible to obtain an approximately constant carrying power within a wide range of angles of incidence up to a maximum angle of incidence of approximately 32°–34°. By arranging the said member or members in positions slightly displaced from those in which the turbulent effect in the "limiting-layer" is produced, it is also possible to obtain an increase in the angle of incidence corresponding to maximum lift as compared with a carrying aerofoil having no means for rendering the fluid turbulent.

By causing the fluid layer in contact with the aerofoil or hydrofoil to become turbulent, the adherence of the fluid to the surface of the aerofoil or hydrofoil is considerably reduced, thereby reducing the viscous effect exerted thereon by the main body of the fluid, the viscous drag having been found to be the chief cause of the premature detachment of the fluid currents.

The member or members for rendering the "limiting-layer" of the fluid turbulent may consist of wires, laths or bars of various shapes, suitably located in the zone of the leading edge of the aerofoil or hydrofoil.

The invention will be more particularly described with reference to the accompanying drawing, which represents diagrammatically some constructional examples of the invention and in which:—

Figure 1 shows in cross-section, an aeroplane wing provided with a member for rendering the fluid at the leading edge of the wing turbulent.

Figure 2 is a perspective view of the arrangement shown in Figure 1.

Figure 3 shows a similar arrangement to that illustrated in Figure 1, wherein the member for rendering the fluid turbulent consists of a bar.

Figures 4$^a$ to 4$^g$ show in cross-section a plurality of differently shaped members which may be employed for rendering the fluid turbulent.

Figure 5 shows a modified construction in which two members for rendering the fluid turbulent are provided.

Figure 6 shows a modified construction in which three members for rendering the fluid turbulent are provided;

Figure 7 illustrates the combination of a member for rendering the "limiting layer" turbulent in accordance with the invention and a well-known auxiliary aileron constituting the so-called "slotted wing".

Referring to Figures 1 and 2, in front of an aeroplane wing B, in a position that can readily be experimentally determined, to excite turbulence in the path of the limiting layer of air flow, is stretched a wire A constituting, in accordance with the invention, the member or bar for rendering the fluid turbulent. The zone of the leading edge of the wing B within which the wire A will be approximately located is indicated by the dotted line R. The wire A is held in any convenient manner, for example by means of two supports C mounted on the wing B (Figure 2).

In the modified form illustrated in Figure 3, the member for rendering the fluid in the "limiting layer" turbulent, in accordance with the invention, consists in a lath or flat bar A, arranged in the zone enclosed by the dotted line R. The cross-sectional shape of the lath or bar, the width of which is of the order of the "limiting layer" to be influenced thereby, may be of any desired form, for example, it may assume any one of the seven shapes indicated in Figure 4. Its wide face stands approximately parallel to the under wing surface.

In the modified form shown in Figure 5, instead of a single wire, two wires $A_2$ are provided, the two wires being arranged in this case also in the zone of the leading edge of the wing B. In the modification shown in Figure 6, three wires $A_3$ are stretched in the zone of the leading edge of the wing B.

Referring to Figure 7, an auxiliary wing or vane D of known type constitutes in association with the main wing B, the slot D' of the slotted wing system. The member $A_4$ for rendering the fluid in the "limiting layer" turbulent in accordance with the invention, is arranged in front of the leading edge of the wing B, substantially along the inlet to the slot or elsewhere to excite turbulence in the stream traversing the slot.

In the case of the application of the arrangement in accordance with the invention to aerial or marine propellers, as well as to other propelling apparatus, the driving action of which is due to the motion of a blade surface in a fluid, the member or members for rendering the fluid turbulent is or are arranged in front of that edge of the blade which is advancing in the fluid.

It will be appreciated that in practice, numerous modifications may be introduced according to the particular problem under consideration.

For example, instead of one or more continuous members, a plurality of elements, in axial alignment or displaced axially with respect to one another, may be provided. Further, adjusting means may be provided for varying the tension of the members. The members (wires, laths, bars or the like) for rendering the fluid turbulent, may be supported by intermediate supports instead of, or in addition to, the end supports. Moreover, the laths, bars or the like members for rendering the fluid turbulent may be movable either automatically or by means of a manually operable control. Finally the member for rendering the fluid turbulent may serve also for other purposes, for instance, it may if constructed of electrically conducting material, serve as an aerial for radio transmission or reception.

Having now particularly described and ascertained the nature of my said invention and in what manner the same is to be performed, I declare that what I claim is:

1. Control means for aerofoils etc. comprising a transverse bar device suspended adjacent and in spaced relation to and in front of and parallel to the leading edge of the aerofoil, and having its greatest sectional dimension substantially not over four per cent of the chord of the aerofoil; whereby said device is adapted by its said location and small dimension to excite turbulence in the fluid boundary layer above the upper surface of the aerofoil, thereby to cause such boundary layer to flow in substantially closer proximity to such upper surface and thereby minimize burbling and loss of lift beyond the normal critical or stalling angle of incidence of the aerofoil.

2. Control means as in claim 1 and wherein the transverse bar device comprises a wire stretched in place by mountings on the aerofoil.

3. Control means as in claim 1 and wherein the transverse bar device comprises a single lath with its wide face approximately parallel to the under surface of the aerofoil.

4. Control means for aerofoils etc. comprising, in combination with the main aerofoil or wing and an auxiliary wing in front thereof and forming therewith a wing slot extending from the inferior to the superior side of the wing, a transverse bar device having a sectional dimension relatively much smaller than that of such auxiliary wing, and under five percent of the chord of the aerofoil, the same suspended adjacent and in spaced relation to and in front of and parallel to the leading edge of the aerofoil and in the vicinity of the lower opening of such wing slot, thereby to excite turbulence in the fluid layer traversing such slot.

GIAN DOMENICO MATTIOLI.